US010430417B2

(12) United States Patent
Sharma et al.

(10) Patent No.: US 10,430,417 B2
(45) Date of Patent: Oct. 1, 2019

(54) SYSTEM AND METHOD FOR VISUAL BAYESIAN DATA FUSION

(71) Applicant: Tata Consultancy Services Limited, Mumbai (IN)

(72) Inventors: Geetika Sharma, Gurgaon (IN); Karamjit Singh, Gurgaon (IN); Garima Gupta, Gurgaon (IN); Gautam Shroff, Gurgaon (IN); Puneet Agarwal, Noida (IN); Aditeya Pandey, Gurgaon (IN); Kaushal Ashokbhai Paneri, Gurgaon (IN); Gunjan Sehgal, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 194 days.

(21) Appl. No.: 15/454,830

(22) Filed: Mar. 9, 2017

(65) Prior Publication Data

US 2017/0262506 A1 Sep. 14, 2017

(30) Foreign Application Priority Data

Mar. 10, 2016 (IN) .............................. 201621008419

(51) Int. Cl.
*G06F 16/30* (2019.01)
*G06F 16/2455* (2019.01)
(Continued)

(52) U.S. Cl.
CPC ........ *G06F 16/2456* (2019.01); *G06F 16/248* (2019.01); *G06F 16/2462* (2019.01);
(Continued)

(58) Field of Classification Search
CPC ......... G06F 17/30498; G06F 17/30961; G06F 16/30498; G06F 16/30961; G06N 7/005; G06N 99/005
See application file for complete search history.

(56) References Cited

U.S. PATENT DOCUMENTS 8,447,710 B1 5/2013 Das
2006/0216496 A2 9/2006 Gray et al.
(Continued)

FOREIGN PATENT DOCUMENTS

WO WO 2011/014169 A1 2/2011

OTHER PUBLICATIONS

Article entitled "Visual Bayesian Fusion to Navigate a Data Lake", by Singh et al., dated Jul. 2016.*
(Continued)

*Primary Examiner* — Mahesh H Dwivedi
(74) *Attorney, Agent, or Firm* — Finnegan, Henderson, Farabow, Garrett & Dunner LLP

(57) ABSTRACT

System and method for visual Bayesian data fusion are disclosed. In an example, a plurality of datasets associated with a topic are obtained from a data lake. Each of the plurality of datasets include information corresponding to various attributes of the topic. Further, the plurality of datasets are joined to obtain a joined dataset. Furthermore, distribution associated with a target attribute is predicted using Bayesian modeling by selecting a plurality of attributes (k) based on mutual information with the target attribute in the joined dataset, learning a minimum spanning tree based Bayesian structure using the selected attributes and the target attribute, learning conditional probabilistic tables at each node of the minimum spanning tree based Bayesian structure; and predicting the distribution associated with the target attribute by querying the conditional probabilistic tables, thereby facilitating visual Bayesian data fusion.

13 Claims, 5 Drawing Sheets

(51) Int. Cl.
  G06N 20/00 (2019.01)
  G06F 16/248 (2019.01)
  G06F 16/901 (2019.01)
  G06N 7/00 (2006.01)
  G06F 16/26 (2019.01)
  G06F 16/25 (2019.01)
  G06F 16/2458 (2019.01)

(52) U.S. Cl.
  CPC ............ *G06F 16/256* (2019.01); *G06F 16/26* (2019.01); *G06F 16/9027* (2019.01); *G06N 7/005* (2013.01); *G06N 20/00* (2019.01)

(56) References Cited

U.S. PATENT DOCUMENTS

| | | | | |
|---|---|---|---|---|
| 2009/0192955 | A1* | 7/2009 | Tang | G06K 9/6269 706/12 |
| 2012/0215735 | A1* | 8/2012 | Abielmona | G06N 7/005 706/52 |
| 2014/0153443 | A1* | 6/2014 | Carter | H04L 45/48 370/256 |
| 2014/0181076 | A1* | 6/2014 | Au | G06F 17/30498 707/714 |
| 2015/0363643 | A1* | 12/2015 | Huber | G06N 7/005 382/103 |

OTHER PUBLICATIONS

Article entitled "Business Data Fusion", by Yadav et al., dated Jul. 9, 2015.*
Article entitled "Learning Bayesian Belief Networks an approach based on the MDL Principle", dated 1994, by Lam et al.*
Article entitled "Multi Sensor Data Fusion" issued to Durrant-Whyte on Jan. 22, 2001.*
Singh et al., "Nearest Keyword Set Search in Multi-dimensional Datasets", Journal IEEE Transactions on Knowledge and Data Engineering, ACM, Inc, vol. 28 Issue 3, pp. 741-755, (2016) https://arxiv.org/pdf/1409.3867.pdf.
Varma et al., "An Approach for Finding Attribute Dependencies in an Anonymized Data", Int. J. Computer Technology & Applications, vol. 5, Issue 3, pp. 833-839, (2014) http://www.ijcta.com/documents/volumes/vol5issue3/ijcta2014050305.pdf.
Murray et al., "Multiple Imputation of Missing Categorical and Continuous Values via Bayesian Mixture Models with Local Dependence", Journal of the American Statistical Association, vol. 111, Issue 516, pp. 1-50, (2015) https://arxiv.org/pdf/1410.0438.pdf.
Sencer et al., "Bayesian Structural Learning with Minimum Spanning Tree Algorithm", The 2013 International Conference on Information and Knowledge Engineering (IKE'13), pp., 1-7, (2013) http://worldcomp-proceedings.com/proc/p2013/IKE2490.pdf.
Kraskov, A. et al. (2004). "Estimating mutual information," *Physical Review E*, vol. 69, No. 6; pp. 066138-1-066138-16.
Ahlberg, C. (1996). "Spotfire: An Information Exploration Environment," *ACM SIGNMOD Record*, vol. 25, No. 4; pp. 25-29.
Jones, B. et al. (2011). "JMP statistical discovery software," *Wiley Interdisciplinary Reviews: Computational Statistics*, vol. 3, No. 3; pp. 188-194.
Roberts, J.C. "State of the Art: Coordinated & Multiple Views in Exploratory Visualization," *CMV '07 Fifth International Conference on IEEE*, Zurich, Switzerland, Jul. 2, 2007; 11 pages.
Sharma, G. et al. "Multi-Sensor Visual Analytics supported by Machine-learning Models," *2015 IEEE 15th International Conference on Data Mining Workshops*, Atlantic City, NJ, Nov. 14-17, 2015; pp. 668-674.
Hall, D.L. et al. (Jan. 1997). "An Introduction to Multisensor Data Fusion," *Proceedings of the IEEE*, vol. 85, No. 1; pp. 6-23.
Mutlu, M. et al. (2008). "Mapping surface fuel models using lidar and multispectral data fusion for fire behavior," *Remote Sensing of Environment*, vol. 112; pp. 274-285.
Buede, D. M. et al. (Sep. 1997). "A Target Identification Comparison of Bayesian and Dempster-Shafer Multisensor Fusion," *IEEE Transactions on Systems, Man, and Cybernetics—Part A: Systems and Humans*, vol. 27, No. 5; pp. 569-577.
Pinheiro, P. et al. "Bayesian Sensor Fusion for Cooperative Object Localization and World Modeling," *Proceedings of the 8th Conference on Intelligent Autonomous Systems Citeseer*, Amsterdam, Netherlands, Mar. 10-13, 2004; 8 pages.
Steinberg, A.N. e tal. (1999). "Revisions to the JDL Data Fusion Model," *International Society for Optics and Photonics*, 18 pages.
Heinrich, J. et al. (2013). "State of the Art of Parallel Coordinates," *Eurographics (STARS)*; 22 pages.
Australian Examination Report dated Nov. 7, 2017, issued in counterpart AU Application No. 2017201653; 4 pages.
Canadian Examination Report dated Dec. 11, 2017, issued in counterpart CA Application No. 2,960,505.
European Search Report dated Jul. 14, 2017, directed to EP Application No. 17 16 0100; 9 pages.
Japanese Office Action dated Jul. 3, 2018, directed to JP Application No. 2017-046609; 3 pages.
Yadav S. et al. et al. "Business data fusion," *Information Fusion (FUSION) 2015 18th International Conference on Information Fusion*, Washington, DC, Jul. 6-9, 2015; pp. 1876-1885.
Ver Steeg, G. (Nov. 2014) "Non-parametric entropy estimation toolbox (NPEET)," located at <https://www.isi.edu/~gregv/npeet_doc.pdf> visited on Feb. 19, 2019. (pp. 1-7).
Zobel, J. et al. (Jul. 2006). "Inverted files for text search engines," *ACM Computing Surveys (CSUR)*, vol. 38, No. 2; pp. 1-56.
Waltz, E. et al. (1990) "Multisensor data fusion," located at <https://procon.bg/system/files/02.12_Monitor.pdf> visited on Feb. 19, 2019. (17 pages).
Lam et al. (May 1994). "Learning Bayesian Belief Networks an approach based on the MDL Principle," *Computational Intelligence*, vol. 10, No. 3; pp. 269-293.
Qlik Q. (2019). "Qlikview," located at <http://www.qlikview.com> visited on Feb. 19, 2019.
Agarwal, P. et al. "Approximate Incremental Big-Data Harmonization," *2013 IEEE International Congress on Big Data*, Santa Clara, California, Oct. 6-9, 2013; 8 pages.
Singh, K. et al. "Visual Bayesian Fusion to Navigate a Data Lake," *19th International Conference on Information Fusion*, Heidelberg, Germany, Jul. 5-8, 2016; 8 pages.
Abidi, M.A.et al. ed. (1992). *Data Fusion in Robotics and Machine Intelligence*. Academic Press, Inc., pp. 1-531.

* cited by examiner

US 10,430,417 B2

SYSTEM AND METHOD FOR VISUAL BAYESIAN DATA FUSION

PRIORITY CLAIM

This U.S. Patent application claims priority under 35 U.S.C. § 119 to India Application No. 201621008419, filed on Mar. 10, 2016. The entire contents of the aforementioned application are incorporated herein by reference.

TECHNICAL FIELD

The embodiments herein generally relate to data fusion and, more particularly, to system and method for visual Bayesian data fusion.

BACKGROUND

The evolution from traditional business intelligence to big data analytics has witnessed the emergence of data lakes in which data is ingested in raw form rather than into traditional data warehouses. With the increasing availability of many more pieces of information or data about each entity of interest, e.g., a customer, often from diverse sources (social media, mobility, internet-of-things), fusing, visualizing and deriving insights from such data may pose a number of challenges. The challenges are due to disparate datasets which often lack a natural join key. Also, the datasets may describe measures at different levels of granularity, e.g., individual versus aggregate data, different datasets may be derived from physically distinct populations. Moreover, once data has been fused, queries are often an inefficient and inaccurate mechanism to derive insight from high-dimensional data.

SUMMARY

Embodiments of the present disclosure present technological improvements as solutions to one or more of the above-mentioned technical problems recognized by the inventors in conventional systems. In view of the foregoing, embodiments herein provide a system and method for visual Bayesian data fusion.

In view of the foregoing, an embodiment herein provides methods and systems for visual Bayesian data fusion are disclosed. In one embodiment, a processor-implemented method includes steps of: obtaining a plurality of datasets associated with a topic from a data lake, wherein each of the plurality of datasets comprise information corresponding to various attributes of the topic; joining the plurality of datasets to obtain a joined dataset; predicting distribution associated with a target attribute using Bayesian modeling by selecting a plurality of attributes (k) based on mutual information with the target attribute in the joined dataset; learning a minimum spanning tree based Bayesian structure using the selected attributes and the target attribute; learning conditional probabilistic tables at each node of the minimum spanning tree based Bayesian structure; and predicting the distribution associated with the target attribute by querying the conditional probabilistic tables, thereby facilitating visual Bayesian data fusion.

In another embodiment, a system for visual Bayesian data fusion is disclosed. The system includes one or more memories; and one or more hardware processors, the one or more memories coupled to the one or more hardware processors, wherein the one or more hardware processors are capable of executing programmed instructions stored in the one or more memories to: obtain a plurality of datasets associated with a topic from a data lake, wherein each of the plurality of datasets comprise information corresponding to various attributes of the topic; join the plurality of datasets to obtain a joined dataset; predict distribution associated with a target attribute using Bayesian modeling by select a plurality of attributes (k) based on mutual information with the target attribute in the joined dataset; learn a minimum spanning tree based Bayesian structure using the selected attributes and the target attribute; learn conditional probabilistic tables at each node of the minimum spanning tree based Bayesian structure; and predict the distribution associated with the target attribute by querying the conditional probabilistic tables, thereby facilitating visual Bayesian data fusion.

In yet another embodiment, a non-transitory computer-readable medium having embodied thereon a computer program for executing a method for visual Bayesian data fusion is disclosed. The method includes steps of: obtaining a plurality of datasets associated with a topic from a data lake, wherein each of the plurality of datasets comprise information corresponding to various attributes of the topic; joining the plurality of datasets to obtain a joined dataset; predicting distribution associated with a target attribute using Bayesian modeling by selecting a plurality of attributes (k) based on mutual information with the target attribute in the joined dataset; learning a minimum spanning tree based Bayesian structure using the selected attributes and the target attribute; learning conditional probabilistic tables at each node of the minimum spanning tree based Bayesian structure; and predicting the distribution associated with the target attribute by querying the conditional probabilistic tables, thereby facilitating visual Bayesian data fusion.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present technique describes about visual Bayesian data fusion. In this technique, attributes which are most relevant to predict a target attribute are learnt. Next, an efficiently executable Bayesian network is learnt on this feature subset (via an minimum spanning tree embedded in a graph derived from pair-wise mutual information values). The technique then uses exact inference to predict the target attribute.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for cheque image data masking, has been explained in details with respect to the FIGS. 1 through 4. While aspects of described methods and systems for visual Bayesian data fusion can be implemented in any number of different systems, utility environments, and/or configurations, the embodiments are described in the context of the following exemplary system(s).

Figure 1:
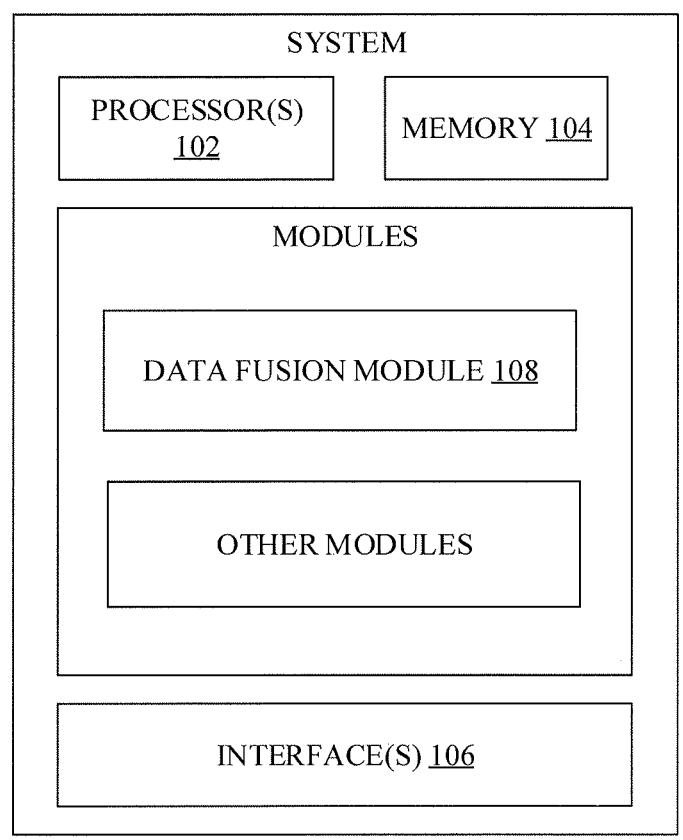
FIG. 1 illustrates a system for visual Bayesian data fusion, according to an embodiment of a present subject matter.

FIG. 1 illustrates a block diagram of a system 100 for visual Bayesian data fusion, in accordance with an example embodiment. In an example embodiment, the system 100 may be embodied in, or is in direct communication with a computing device. The system 100 includes or is otherwise in communication with one or more hardware processors such as processor(s) 102, one or more memories such as a memory 104, and a network interface unit such as a network interface unit 106. In an embodiment, the processor 102, memory 104, and the network interface unit 106 may be coupled by a system bus such as a system bus or a similar mechanism. Although FIG. 1 shows example components of the system 100, in other implementations, the system 100 may contain fewer components, additional components, different components, or differently arranged components than depicted in FIG. 1.

The processor 102 may include circuitry implementing, among others, audio and logic functions associated with the communication, and imaging, displaying, decoding and rendering functions. For example, the processor 102 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 102 thus may also include the functionality to encode messages and/or data or information. The processor 102 may include, among other things, a clock, an arithmetic logic unit (ALU) and logic gates configured to support operation of the processor 102. Further, the processor 102 may include functionality to execute one or more software programs, which may be stored in the memory 104 or otherwise accessible to the processor 102.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 104, may store any number of pieces of information, and data, used by the system to implement the functions of the system. The memory 104 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system to behave in a manner as described in various embodiments. The memory 104 includes a data fusion module 108 and/or other modules. The module 108 include routines, programs, objects, components, data structures, etc., which perform particular tasks or implement particular abstract data types. The other modules may include programs or coded instructions that supplement applications and functions of the system 100.

In operation, the data fusion module 108 obtains a plurality of datasets associated with a topic from a data lake. For example, each of the plurality of datasets include information (i.e., text or retailer description) corresponding to various attributes of the topic. Further, the data fusion module 108 joins the plurality of datasets to obtain a joined dataset. In an example, the plurality of datasets are joined based on a type of join. The concept of data join is to merge relevant attributes from different datasets and create a candidate file for learning correlations among these datasets. In this example, the type of join includes an inner join, an outer join, a left join, and a right join. In the inner join, common data from the datasets is kept. In the outer join, all the data from the datasets is kept. In the left join, common data from both datasets and data from a first dataset is kept. In the right join, common data from both datasets and data from a second dataset is kept.

Furthermore, the data fusion module 108 provides keyword-based search over the datasets. When datasets are added, the data fusion module 108 automatically generates tags based on column headers and used for indexing files. In an example, users may be enabled to add tags and enter the tags as search keywords for retrieval later. In addition, the data fusion module 108 performs exploratory data analysis to get a better understanding data before Bayesian modelling can be done. The data fusion module 108 provides many visualizations for exploratory analysis as described below.

Motion Charts: A multi-dimensional visualization which can visually represent up to 4 temporal data attributes using position, size and color of circles. Motion animation of the circles is used to depict changes in data over time.

Parallel Coordinates: A multi-dimensional data visualization which allows a larger number of data attributes to be visualized together. Attributes are represented as multiple parallel vertical or horizontal axes and a data point is represented as a polyline connecting points on each attribute axis (last two axes visualize error between actual and predicted salary). The order of axes may be changed by dragging and attributes can be deleted or added to the plot.

Bubble Map Charts: Plot bubbles or circles at geographical locations on a map with data attributes mapped to properties of the bubble such as size and color.

Cartograms: Use maps to visualize data about regions such as countries and states. Color and rubber sheet distortions in area proportional to data values allow easy comparison of spatial data. The visualization designs further includes data tiles display icons for visualizations associated with them. In case multiple visualizations can be drawn for a single dataset, an icon for each is displayed and clicking the icon opens the selected visualization. All visualizations open in the 'compare view' page. A list of thumbnails is displayed on the left side of the page using which users can re-order visualizations vertically, close or open the thumbnails in a full screen mode.

Furthermore in operation, the data fusion module 108 performs model learning on the datasets. In an example implementation, the data fusion module 108 predicts distribution associated with a target attribute using Bayesian modeling. For example, the data fusion module 108 enables users to choose multiple attributes from different datasets, and add them to an attribute-cart. After they select one variable as the target variable or attribute, they can request for automatic creation of the network. In this example, dependencies between attributes from different datasets may be discovered using Bayesian networks. A Bayesian network (BN) is a graphical structure that allows representation and reasoning about an uncertain domain. It is a representation of joint probability distribution (JPD) which consist of two components. The first component G is directed acyclic graph whose vertices correspond to random variables. The second component, the conditional probability table (CPT), describes the conditional distribution for each variable given its parent nodes. A CPT of a node indicates the probability that the each value of a node can take given all combinations of values of its parent-nodes. Considering a BN consisting of N random variables $X=(X_1, X_2, \ldots, X_N)$, the general form of joint probability distribution of the BN can be represented as in Equation 1, which encodes the BN property that each node is independent of other nodes, given its parents, where $Pa(X_i)$ is the set of parents of $X_i$.

$$P(X_1, X_2, \ldots, X_n) = \prod_{i=1}^{n} P(X_i \mid Pa(X_i)) \quad (1)$$

Further, the data fusion module 108 selects a plurality of attributes (k) based on mutual information with the target attribute in the joined dataset. The plurality of attributes and the target attribute may include discrete and continuous variables. In an embodiment, the data fusion module 108 selects top-K features from the dataset based on the mutual information of all features with target variable. Mutual information between continuous-continuous, and continuous-discrete variables may be calculated using non-parametric entropy estimation toolbox (NPEET). This tool implements an approach to find mutual information estimators, which is based on entropy estimates from k-nearest neighbor distances. For example, mutual information between x and y variables is calculated using the following equation:

$$I(X; Y) = \sum_{y \in Y} \sum_{x \in X} p(x, y) \log\left(\frac{p(x, y)}{p(x)p(y)}\right),$$

Figure 2:
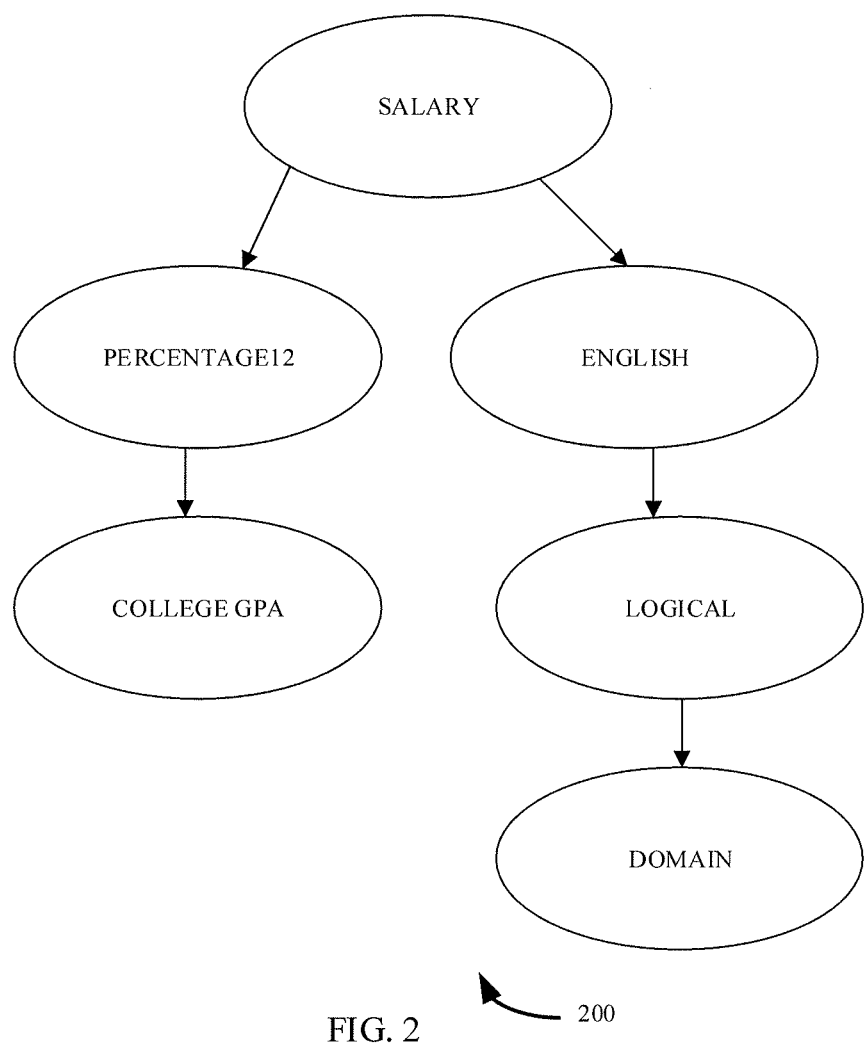
FIG. 2 illustrates a minimum spanning tree network learned on a feature subset, according to an embodiment of a present subject matter.

Furthermore, the data fusion module 108 learns a minimum spanning tree (MST) based Bayesian structure (e.g., a MST 200 shown in FIG. 2) using the selected attributes and the target attribute (e.g., salary in FIG. 2). In an example embodiment, the data fusion module 108 learns the minimum spanning tree (MST) on the plurality of attributes and the target attribute using pairwise mutual information as a threshold. For example, the data fusion module 108 learns a minimum spanning tree on feature graph, created by calculating pairwise mutual information between various features (i.e., variables or attributes), and dropping the edges that have this mutual information smaller than the threshold. In this example, the minimum spanning tree ensures learning sparse structures which helps in better estimation of parameters (especially in case of data having high cardinality variables) and faster inference.

In addition, the data fusion module 108 initializes each edge in the minimum spanning tree to random direction. Moreover, the data fusion module 108 flips each edge direction to compute 2^(k) directed graphs. As 'k' is a number of edges in the MST based structure, when the data fusion module 108 flips edge direction of each edge, 2^(k) different trees or graphs are computed. Further, the data fusion module 108 calculates the cross entropy of each graph. Also, the data fusion module 108 selects a graph with least cross entropy as the minimum spanning tree based Bayesian structure.

Furthermore, the data fusion module 108 learns conditional probabilistic tables at each node of the minimum spanning tree based Bayesian structure (i.e., parameters of each node). In an example, the data fusion module 108 discretizes the continuous variables by fixed size binning. The data fusion module 108 learns the conditional probabilistic tables at each node of the minimum spanning tree based Bayesian structure upon discretizing the continuous variables. Moreover, the data fusion module 108 predicts the distribution associated with the target attribute by querying the conditional probabilistic tables, thereby facilitating visual Bayesian data fusion. The data fusion module 108 uses SQL for querying the CPTs considering them as set of relational tables.

In an example embodiment, the data fusion module 108 uses the Bayesian networks for prediction. Often attributes may need to be predicted for new datasets in which they do not exist at all. The data fusion module 108 may use the saved Bayesian network to predict the target variable for new datasets in which it may be missing using imputation: the expected value of the target variable is computed from the posterior distribution obtained after Bayesian inference and used as the predicted.

In another example embodiment, the data fusion module 108 uses Bayesian networks to determine the missing data. Very often data values may be missing for certain attributes of constituent datasets in the data lake, reducing the utility of such datasets. The data fusion module 108 provides data completion feature using Bayesian imputation. Attributes that are part of a Bayesian network may be imputed in datasets where they are partially missing. For this, users are enabled to select a network based tile to be used for imputation as well as the dataset with missing values. The data fusion module 108 then generates a new dataset with complete data, included in the inverted-index, and made available for further visual analysis.

For example, consider a challenge to predict salary for a set of candidates for whom it was not provided. The data fusion module 108 uses the MST, learned on the relevant feature subset, to predict the salary of each candidate in the test dataset using rest of the features in a network as evidence. Further, the data fusion module 108 uses exact inference accelerated by an SQL engine which internally performs query optimization which is analogous to poly-tree based exact inference to predict the salary.

Figure 3A:
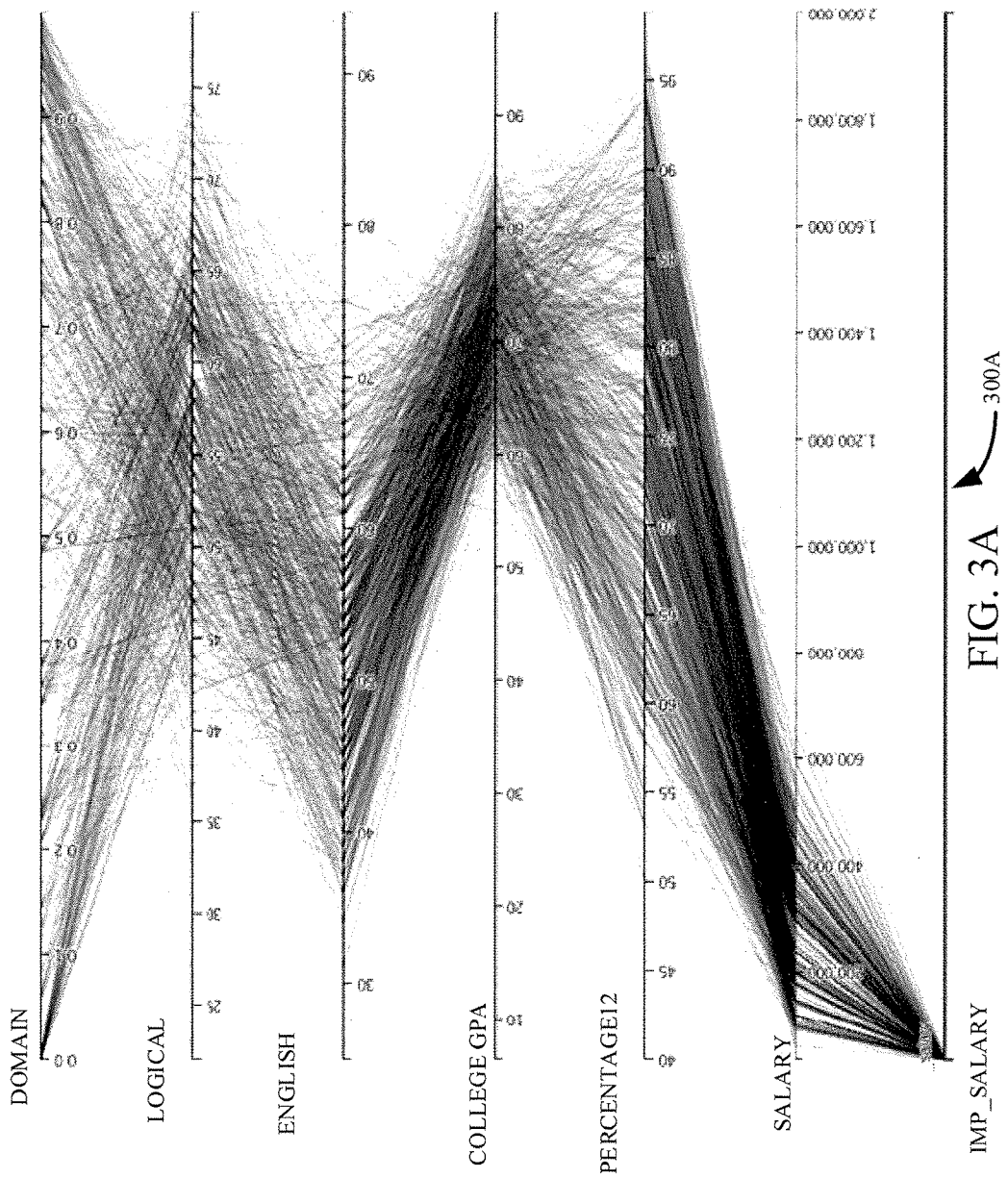
FIGS. 3A and 3B illustrate salary imputations for a dataset, according to an embodiment of a present subject matter.
Figure 3B:
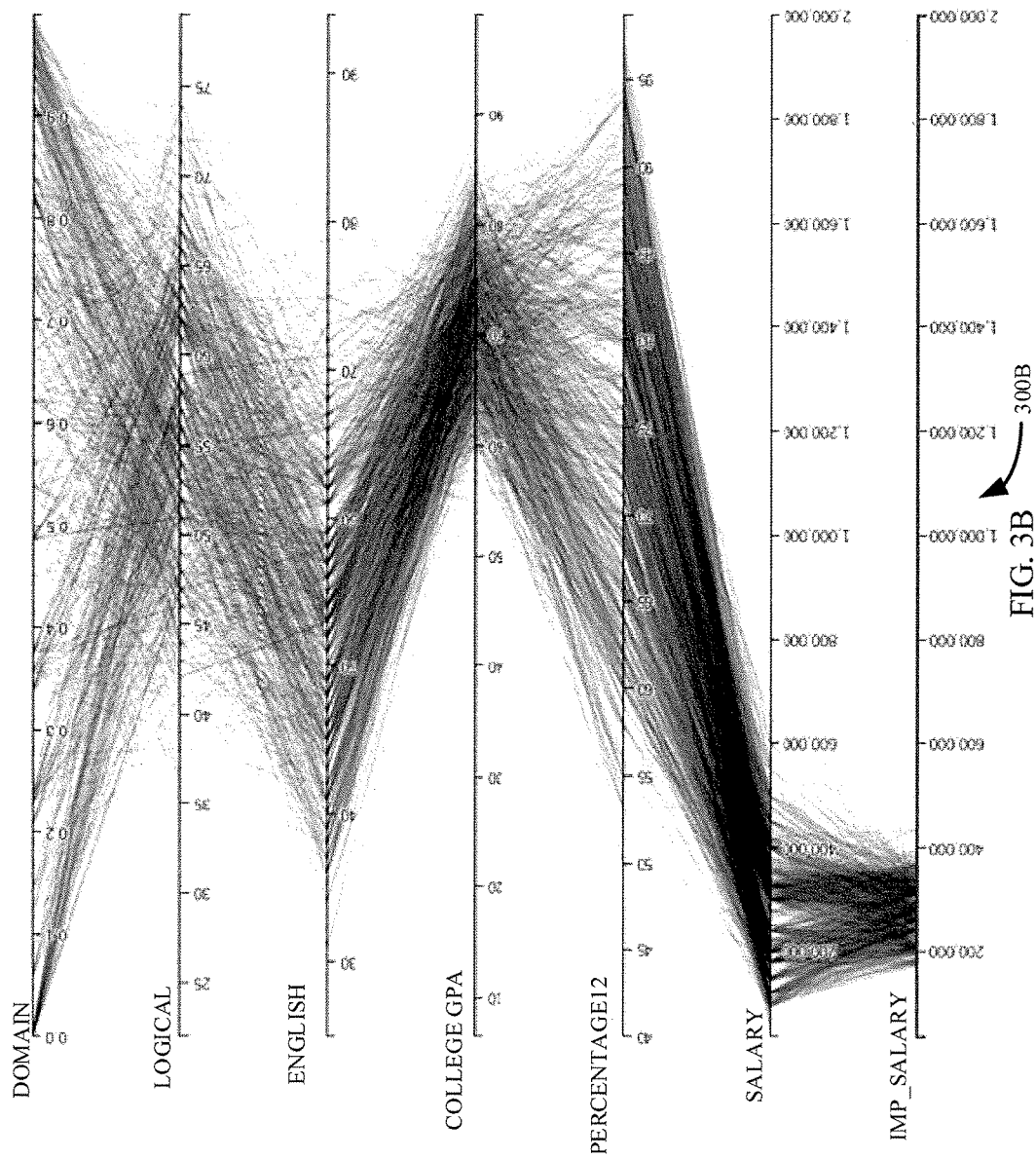

In some embodiments, the system 100 provides a visual interface for model-based prediction using parallel coordinates. The user is enabled to select a network to be used for prediction via imputation and a dataset with the target variable missing. In this embodiment, a horizontal parallel coordinates plot is used to differentiate it from the exploratory parallel co-ordinates visualization as well as to indicate a network structure which is usually drawn in a top-down order even though the edges have no directionality in this case. The value of the attribute to be imputed is 0 for all data points initially as shown in graph 300A (graph before imputation) of FIG. 3A. Clicking the 'Impute' button fires the data fusion module 108 at the backend and lines for the imputed values are moved to their position along the axis, as shown in graph 300B (graph after imputation) of FIG. 3B. A visualization of the predicted salary on test data created from of the training data in 70-30(%) ratio is shown in FIGS. 3A and 3B. The error in prediction can be visualized in 300B on the last two axes—actual salary and imputed salary.

In another example embodiment, the data fusion module 108 uses the MST based Bayesian structure for probabilistic join. For example, data from disparate sources may not have a common join key however their fusion may be warranted for analytical reasoning. This is achieved by predicting global-product id for every local-product-id using an ensemble of Bayesian prediction and textual similarity.

Consider, a data lake consisting of real-life data of consumer products from a global 'information and measurement' company. Available datasets in the data lake are as follows:

1) Local dataset: It contains set of items I={Ir : r=1, 2, . . . , m}. For each item Ir ∈ I, local attributes, retailer descriptions, as well as measures such as sales figures are available.

2) Global dataset: It contains the global market share of each item, where items are described by global attributes. In this example, local attributes may be different from those used in the global dataset (i.e., these may include attributes not used at the global level). Even for similar attributes, local attributes use geography specific nomenclature, differing from global naming conventions. For example, in case of carbonated drinks, both global and local datasets may contains brand, flavour etc., of a drink, however, the actual values used may differ: e.g., 'Coke' vs 'Coca-cola', or 'Sweetened', vs 'Contains sugar'. Additionally, local attributes include 'retailer descriptions', which are fields with free form text describing the product. Such text often points clues towards the global attributes for the item.

Consider a scenario where country wise sales vs global market share of each brand needs to be compared. The datasets cannot be compared as there is no natural join key between these two datasets. However, if value of global attribute g ∀ $I_r$∈ I can be predicted using local attributes (Bayesian model) and retailer description, the datasets can be compared. Thus, the data fusion module 108 make probabilistic prediction of g for items in local dataset. Further, the data fusion module 108 join the local dataset with the global dataset using g as a join key and call it as probabilistic join. Let g be the global attribute with n possible states say $g_i$, where i=1, 2, . . . , n. In order to predict value of g ∀ $I_r$∈ I, the data fusion module 108 uses two different models, a) Bayesian Model and b) Text Information Retrieval Model which uses local attributes and retailer description, respectively. The data fusion module 108 also calculate confidence of prediction in both models. Further, the data fusion module 108 do ensemble of these two models to get the better prediction accuracy.

Bayesian Model (BM): In BM, the data fusion module 108 use only local attributes to predict global attributes for each item. For a global attribute g, the data fusion module 108 selects top K local attributes based on mutual information with g. Further, the data fusion module 108 learns minimum spanning tree based structure with global attribute g and selected top K local attributes. Furthermore, the data fusion module 108 calculates probability $\{p_i: i=1, \ldots, n\}$ of each state gi of global attribute g, with local attributes as evidence in the MSTN. Finally, for every item, the data fusion module 108 choose the state gi which have maximum probability $p_i$.

Confidence in BM Model (ConfBM): For each item, the data fusion module 108 also calculates the confidence of prediction of BM model. Given a probability distribution $\{p_i: i=1, 2, \ldots, n\}$ for a global attribute g. Consider an ideal distribution $$q_i = \begin{cases} 1 & p_i = \max\{p_i : i = 1, 2, \ldots, n\} \\ 0 & \text{otherwise} \end{cases}$$

and the confidence is given by:

$$Conf_{BM} = 1 - \sqrt{\sum_{i=1}^{n} (p_i - q_i)^2}$$

For each item $I_r$, the data fusion module 108 predicted two values (say $g_B$ and $g_T$) of g using local attributes (along with its confidence $c_B$) and retailer description, respectively. For an item $I_r$, the data fusion module 108 chooses $g_B$ as the prediction of g if $c_B>t$, else chooses $g_T$ as a prediction of g, where t is the threshold learned on validation set. Once global attribute of every item in a set I of local dataset is predicted, the data fusion module 108 joins local dataset and global dataset after group by using $g_i$ as a key in local datasets.

In an example embodiment, the data fusion module 108 uses Bayesian networks to make inferences and for 'what-if' analysis. The data fusion module 108 provides a 'Linked Query View' for the same. A 'Linked View' in data visualization parlance refers to a view containing multiple charts such that interaction with any chart synchronously updates all. The data fusion module 108 uses a linked view to visualize conditional queries on attributes in the network. Once a network has been saved, it can be used to perform visual model inferencing using a 'Linked Query View'. The data fusion module 108 enables user to selects n attributes from the network to query and these are visualized in an n×n chart grid with attributes repeated horizontally and vertically. Charts along the diagonal, show the probability distributions of the corresponding attribute as bar charts. In the cells above the diagonal, scatter plots of the data with row and column attributes on the x and y axis of the plot, respectively, are shown. These provide a view of the data used to build the network and can be used to analyze pair-wise correlations between attributes.

In order to query the network, users can select ranges for multiple attributes by clicking on appropriate bars in the bar charts. This puts a condition on the attribute to be in the range selected by the user. On hitting the query button, the data fusion module 108 executes a conditional query on the network using Bayesian inference. The conditional distributions of the other attributes are computed and the bar charts are updated accordingly. For example, a 'Bayesian Student Advisor' is designed to provide recommendations using the Linked Query View. The original probability distributions are shown on the diagonal using bar charts. Salary is plotted on log 10 scale. Consider the case when a candidate is interested in getting a very high salary and wants to know the ideal profile for the same. It may be observed that there is a significant rise in the probability of English score, indicating that a candidate must have high English score to get a high salary. Additionally, it is found that although the distributions of logical test score and CGPA do not change much, probability of 12th percentage increases significantly for the higher range bins. Thus, for a very high salary English score and 12th percentage must be high. In this manner, a candidate may impose conditions on any number of the variables in the network and get answers to how his/her profile should change in order to meet the salary goal.

Figure 4:
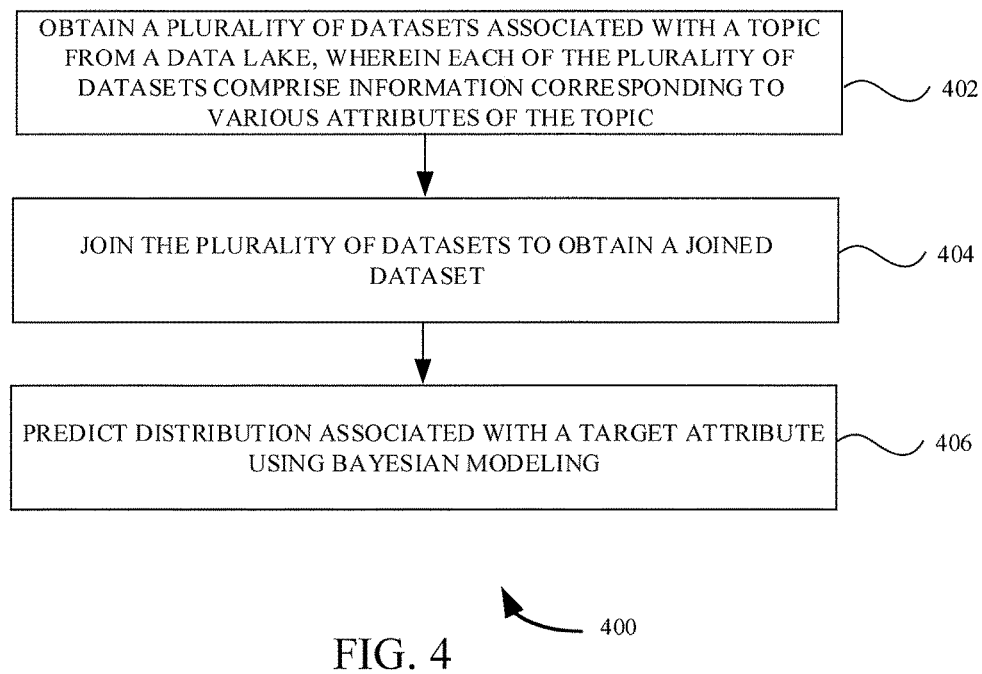
FIG. 4 is a flowchart illustrating a method for visual Bayesian data fusion, according to an embodiment of a present subject matter.

FIG. 4 is a flowchart illustrating a method for visual Bayesian data fusion, according to an embodiment of a present subject matter. The processor-implemented method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof. In an embodiment, the method 400 depicted in the flow chart may be executed by a system, for example, the system 100 of FIG. 1.

At block 402, a plurality of datasets associated with a topic are obtained from a data lake. For example, each of the plurality of datasets include information (i.e., text or retailer description) corresponding to various attributes of the topic. At block 404, the plurality of datasets are joined to obtain a joined dataset. In an example, the plurality of datasets are joined based on a type of join. In this example, the type of join includes an inner join, an outer join, a left join, and a right join. At block 406, distribution associated with a target attribute is predicted using Bayesian modeling. In an embodiment, a plurality of attributes (k) is selected based on mutual information with the target attribute in the joined dataset. The plurality of attributes and the target attribute may include discrete and continuous variables.

Further, a minimum spanning tree based Bayesian structure is learnt using the selected attributes and the target attribute. In an example embodiment, the minimum spanning tree is learnt on the plurality of attributes and the target attribute using pairwise mutual information as a threshold. Further in this embodiment, each edge in the minimum spanning tree is initialized to random direction. Furthermore, each edge direction is flipped to compute $2^{\wedge}(k)$ directed graphs. In addition, the cross entropy of each graph is calculated. Also, a graph with least cross entropy is selected as the minimum spanning tree based Bayesian structure.

Furthermore, conditional probabilistic tables are learnt at each node of the minimum spanning tree based Bayesian structure. In an example, the continuous variables are discretized by fixed size binning. The conditional probabilistic tables are then learnt at each node of the minimum spanning tree based Bayesian structure upon discretizing the continuous variables. Moreover, the distribution associated with the target attribute is predicted by querying the conditional probabilistic tables, thereby facilitating visual Bayesian data fusion.

In some embodiments, a confidence score for the prediction of the distribution associated with the target attribute is computed by querying the conditional probabilistic tables using ideal distribution and probabilistic distribution. Further, distribution associated with the target attribute is predicted using textual similarity. Furthermore, the distribution associated with the target attribute predicted using the textual similarity or the distribution associated with the target attribute predicted by querying the conditional probabilistic tables is selected based on the computed confidence score.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
    obtaining, by one or more hardware processors, a plurality of datasets associated with a topic from a data lake, wherein each of the plurality of datasets comprise information corresponding to various attributes of the topic;
    joining, by the one or more hardware processors, the plurality of datasets to obtain a joined dataset;
    predicting, by the one or more hardware processors, distribution associated with a target attribute using Bayesian modeling by
        selecting a plurality of attributes (k) based on mutual information with the target attribute in the joined dataset;
        learning a minimum spanning tree based Bayesian structure on a feature graph that is created by calculating pairwise mutual information between selected attributes and the target attributes;
        learning conditional probabilistic tables at each node of the minimum spanning tree based Bayesian structure;
        predicting the distribution associated with the target attribute by querying the conditional probabilistic tables, thereby facilitating visual Bayesian data fusion; and
    automatically generating a plurality of tags, based on column headers, to index files in the conditional probabilistic tables.

2. The method of claim 1, wherein the plurality of datasets are joined based on a type of join and wherein the type of join comprises an inner join, an outer join, a left join, and a right join.

3. The method of claim 1, wherein learning a minimum spanning tree based Bayesian structure on the feature graph that is created by calculating the pairwise mutual information between the selected attributes and the target attributes comprises:
    learning the minimum spanning tree on the plurality of attributes and the target attribute using the pairwise mutual information as a threshold;
    initializing each edge in the minimum spanning tree to random direction and dropping edge with mutual information less than the threshold;
    flipping each edge direction to compute $2^{(k)}$ directed graphs;
    calculating the cross entropy of each graph; and
    selecting a graph with least cross entropy as the minimum spanning tree based Bayesian structure.

4. The method of claim 1, wherein the plurality of attributes and the target attribute comprise discrete and continuous variables.

5. The method of claim 4, wherein learning the conditional probabilistic tables at each node of the minimum spanning tree based Bayesian structure comprises:
    discretizing the continuous variables by fixed size binning; and
    learning the conditional probabilistic tables at each node of the minimum spanning tree based Bayesian structure upon discretizing the continuous variables.

6. The method of claim 1, further comprising:
    computing a confidence score for the distribution associated with the target attribute predicted by querying the conditional probabilistic tables using ideal distribution and probabilistic distribution;
    predicting distribution associated with the target attribute using textual similarity; and
    selecting one of a) the distribution associated with the target attribute predicted using the textual similarity and b) the distribution associated with the target attribute predicted by querying the conditional probabilistic tables based on the computed confidence score.

7. A system comprising:
    one or more memories; and
    one or more hardware processors, the one or more memories coupled to the one or more hardware processors, wherein the one or more hardware processors are configured to execute programmed instructions stored in the one or more memories to:
    obtain a plurality of datasets associated with a topic from a data lake, wherein each of the plurality of datasets comprise information corresponding to various attributes of the topic;
    join the plurality of datasets to obtain a joined dataset;

predict distribution associated with a target attribute using Bayesian modeling by
- selecting a plurality of attributes (k) based on mutual information with the target attribute in the joined dataset;
- learning a minimum spanning tree based Bayesian structure on a feature graph that is created by calculating pairwise mutual information between selected attributes and the target attributes;
- learning conditional probabilistic tables at each node of the minimum spanning tree based Bayesian structure;
- predicting the distribution associated with the target attribute by querying the conditional probabilistic tables, thereby facilitating visual Bayesian data fusion; and
- automatically generating a plurality of tags, based on column headers, to index files in the conditional probabilistic tables.

8. The system of claim 7, wherein the plurality of datasets are joined based on a type of join and wherein the type of join comprises an inner join, an outer join, a left join, and a right join.

9. The system of claim 7, wherein one or more hardware processors are further configured to execute the programmed instructions to:
- learn the minimum spanning tree on the plurality of attributes and the target attribute using pairwise mutual information as a threshold;
- initialize each edge in the minimum spanning tree to random direction and dropping edge with mutual information less than the threshold;
- flip each edge direction to compute 2^(k) directed graphs;
- calculate the cross entropy of each graph; and
- select a graph with least cross entropy as the minimum spanning tree based Bayesian structure.

10. The system of claim 7, wherein the plurality of attributes and the target attribute comprise discrete and continuous variables.

11. The system of claim 10, wherein one or more hardware processors are further configured to execute the programmed instructions to:
- discretize the continuous variables by fixed size binning; and
- learn the conditional probabilistic tables at each node of the minimum spanning tree based Bayesian structure upon discretizing the continuous variables.

12. The system of claim 7, wherein one or more hardware processors are further configured to execute the programmed instructions to:
- compute a confidence score for the distribution associated with the target attribute predicted by querying the conditional probabilistic tables using ideal distribution and probabilistic distribution;
- predict distribution associated with the target attribute using textual similarity; and
- select one of a) the distribution associated with the target attribute predicted using the textual similarity and b) the distribution associated with the target attribute predicted by querying the conditional probabilistic tables based on the computed confidence score.

13. A non-transitory computer readable medium embodying a program executable in a computing device, said program comprising:
- a program code for obtaining a plurality of datasets associated with a topic from a data lake, wherein each of the plurality of datasets comprise information corresponding to various attributes of the topic;
- a program code for joining the plurality of datasets to obtain a joined dataset;
- a program code for predicting distribution associated with a target attribute using Bayesian modeling by
  - selecting a plurality of attributes (k) based on mutual information with the target attribute in the joined dataset;
  - learning a minimum spanning tree based Bayesian structure on a feature graph that is created by calculating pairwise mutual information between selected attributes and the target attributes;
  - learning conditional probabilistic tables at each node of the minimum spanning tree based Bayesian structure;
  - predicting the distribution associated with the target attribute by querying the conditional probabilistic tables, thereby facilitating visual Bayesian data fusion; and
  - automatically generating a plurality of tags, based on column headers, to index files in the conditional probabilistic tables.

* * * * *